(12) United States Patent
Bailey

(10) Patent No.: US 12,550,208 B2
(45) Date of Patent: Feb. 10, 2026

(54) METHOD AND APPARATUS FOR HOME MONITORING AND CONTROL SYSTEM SETUP

(71) Applicant: Universal Electronics Inc., Scottsdale, AZ (US)

(72) Inventor: Michael Bailey, Poway, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 370 days.

(21) Appl. No.: 16/014,057

(22) Filed: Jun. 21, 2018

(65) Prior Publication Data

US 2019/0394817 A1  Dec. 26, 2019

(51) Int. Cl.
*H04W 76/14* (2018.01)
*H04L 12/28* (2006.01)
*H04W 4/70* (2018.01)
*H04W 4/80* (2018.01)
*H04W 60/04* (2009.01)

(52) U.S. Cl.
CPC ......... *H04W 76/14* (2018.02); *H04L 12/2803* (2013.01); *H04W 4/70* (2018.02); *H04W 4/80* (2018.02); *H04W 60/04* (2013.01)

(58) Field of Classification Search
CPC ............. H04W 4/70–80; H04W 8/005; H04W 84/18–22; H04L 67/12–125
See application file for complete search history.

(56) References Cited

U.S. PATENT DOCUMENTS

| | | | |
|---|---|---|---|
| 6,930,599 B2 | 8/2005 | Naidoo et al. | |
| 7,526,539 B1 | 4/2009 | Hsu | |
| 7,701,332 B2 | 4/2010 | Anderson | |
| 8,335,470 B2 | 12/2012 | Koyama | |
| 9,534,929 B1* | 1/2017 | Stamatakis | ........ B60H 1/00842 |
| 9,654,481 B1 | 5/2017 | Ho | |
| 9,888,337 B1* | 2/2018 | Zalewski | ........... G06Q 30/0635 |
| 10,231,078 B1* | 3/2019 | Swart | ...................... H04W 4/02 |
| 11,461,670 B2* | 10/2022 | Seemann | ................ H04W 4/33 |
| 2006/0199541 A1* | 9/2006 | Luebke | ............... H04L 12/2803 |
| | | | 455/566 |
| 2015/0063633 A1* | 3/2015 | Hicks | .................... H04W 4/185 |
| | | | 382/103 |
| 2015/0256355 A1* | 9/2015 | Pera | .................... H04L 12/2816 |
| | | | 700/90 |
| 2015/0256544 A1* | 9/2015 | Wu | ..................... H04L 61/5007 |
| | | | 726/12 |

(Continued)

FOREIGN PATENT DOCUMENTS

| | | |
|---|---|---|
| WO | 0186833 W | 11/2001 |
| WO | 0213039 W | 2/2002 |
| WO | 2017156332 A1 | 9/2017 |

OTHER PUBLICATIONS

ISA/US, International Search Report and Written Opinion issued on PCT application No. PCT/US19/37664, dated Sep. 17, 2019, 12 pages.

(Continued)

*Primary Examiner* — Ajay Cattungal

(74) *Attorney, Agent, or Firm* — Greenberg Traurig, LLP

(57) ABSTRACT

A base station used in a home security or home automation/control system is described. The base station is configured to automatically accept new sensors or control modules by placing such new sensors or control modules in proximity to the base station.

7 Claims, 4 Drawing Sheets

(56) References Cited

U.S. PATENT DOCUMENTS

| | | | |
|---|---|---|---|
| 2015/0260523 A1* | 9/2015 | Haverinen | G01C 21/08 |
| | | | 455/457 |
| 2016/0043896 A1 | 2/2016 | Fiedler | |
| 2016/0142877 A1* | 5/2016 | Gujral | E05F 15/77 |
| | | | 455/456.1 |
| 2016/0219517 A1* | 7/2016 | Ylamurto | H04W 52/0219 |
| 2016/0226732 A1* | 8/2016 | Kim | H04W 4/70 |
| 2016/0301373 A1* | 10/2016 | Herman | H04W 4/80 |
| 2016/0337127 A1* | 11/2016 | Schultz | H04L 9/3234 |
| 2017/0006435 A1* | 1/2017 | Yamamoto | H04L 43/04 |
| 2017/0098149 A1* | 4/2017 | Kesler | H02J 50/12 |
| 2017/0099353 A1* | 4/2017 | Arora | H04W 4/70 |
| 2017/0180921 A1* | 6/2017 | Pelochino | H04B 1/385 |
| 2017/0187807 A1* | 6/2017 | Clernon | H04L 67/34 |
| 2017/0201725 A1 | 7/2017 | Siminoff et al. | |
| 2017/0202037 A1* | 7/2017 | Hong | H04W 12/06 |
| 2017/0223514 A1* | 8/2017 | Do | H04L 67/146 |
| 2017/0223808 A1* | 8/2017 | Barna | H05B 47/1995 |
| 2017/0265124 A1* | 9/2017 | Seemann | H04W 4/33 |
| 2017/0280395 A1* | 9/2017 | Altin | H04W 4/70 |
| 2017/0309157 A1* | 10/2017 | Nandanavanam | H04W 12/33 |
| 2017/0316683 A1* | 11/2017 | Pietrasik | G01D 11/245 |
| 2017/0331860 A1* | 11/2017 | Ofversten | H04W 4/38 |
| 2017/0339547 A1* | 11/2017 | Keskitalo | H04W 8/005 |
| 2018/0069932 A1* | 3/2018 | Tiwari | G08B 29/18 |
| 2018/0077646 A1* | 3/2018 | Moran-Cirkovic | |
| | | | H04W 52/0225 |
| 2018/0084517 A1 | 3/2018 | Do | |
| 2018/0152420 A1* | 5/2018 | Britt | H04W 12/04 |
| 2018/0176760 A1* | 6/2018 | Brandt | H05B 47/11 |
| 2018/0199386 A1* | 7/2018 | Yuan | H04W 4/70 |
| 2018/0241488 A1* | 8/2018 | Daoura | H04W 4/70 |
| 2018/0352415 A1* | 12/2018 | Ma | H04B 17/318 |
| 2018/0367616 A1* | 12/2018 | Yang | H04L 67/12 |
| 2018/0376448 A1* | 12/2018 | Wild | H04W 68/005 |
| 2019/0026506 A1* | 1/2019 | Depew | H04W 4/02 |
| 2019/0075025 A1* | 3/2019 | McCann | H04W 4/70 |
| 2019/0089603 A1* | 3/2019 | Harat | H04L 41/5058 |
| 2019/0101306 A1* | 4/2019 | Giorgi | F24F 13/10 |
| 2019/0132396 A1* | 5/2019 | Finnegan | H04L 12/2818 |
| 2019/0234972 A1* | 8/2019 | Oh | G01N 35/00871 |
| 2019/0246344 A1* | 8/2019 | Prasad | H04W 8/005 |
| 2019/0268310 A1* | 8/2019 | Guberman | H04L 67/10 |
| 2019/0272690 A1* | 9/2019 | Kaye | H04W 4/80 |
| 2019/0281371 A1* | 9/2019 | Klicpera | H04Q 9/00 |
| 2019/0296979 A1* | 9/2019 | Gupta | H04L 41/16 |
| 2019/0297123 A1* | 9/2019 | Kim | H04W 4/80 |
| 2019/0354367 A1* | 11/2019 | Rodriguez Bravo | G06F 21/57 |
| 2019/0387489 A1* | 12/2019 | Idnani | H04L 12/2834 |
| 2020/0037160 A1* | 1/2020 | Bartlett | H04W 4/38 |
| 2020/0068393 A1* | 2/2020 | Jung | H04L 63/0853 |
| 2020/0169848 A1* | 5/2020 | Daoura | H04W 4/80 |
| 2021/0049877 A1* | 2/2021 | Daoura | H04H 20/59 |
| 2021/0120090 A1* | 4/2021 | Wang | H04W 8/005 |
| 2021/0166134 A1* | 6/2021 | Seemann | H04W 4/33 |
| 2021/0198921 A1* | 7/2021 | Harris | G07C 9/00944 |
| 2021/0274315 A1* | 9/2021 | Daoura | H04W 4/38 |

OTHER PUBLICATIONS

Kari Kostiainen et al: "Usable Access Control inside Home Networks", World of Wireless, Mobile and Multimedia Networks, 2007. WOWMOM 2007. IEEE International Symposium On A, IEEE, PI, Jun. 1, 2007 (Jun. 1, 2007), pp. 1-6, XP031149243,ISBN: 978-1-4244-0992-1.

Office Action from European application No. 19822436.2, dated Jul. 11, 2023, 6 pp.

* cited by examiner

METHOD AND APPARATUS FOR HOME MONITORING AND CONTROL SYSTEM SETUP

BACKGROUND

I. Field of Use

The present application relates to the field of wireless home networking. More specifically, the present application relates to home security, monitoring and control systems and their respective sensors and control modules.

II. Description of the Related Art

Home security, monitoring and control systems have recently enjoyed widespread acceptance by consumers. Such systems allow for security and convenience to homeowners.

Modern security systems use wireless sensors to determine whether an unauthorized entry has occurred. Such sensors include door/window sensors, passive Infra-Red motion detectors (PIRs), garage door tilt sensors, glass break sensors, etc. Such sensors are monitored by a central, local device, such as a security panel or networked hub or gateway. However, each of these sensors must be "learned" or "included" into the security system so that the security panel, hub, or gateway knows the quantity and type of each security sensor in a home. Such an "inclusion" process is typically so complicated, that a professional installer is often employed in order to properly program the security panel, hub, or gateway with the sensor information. For example, to "include" or "learn" a door sensor, a security panel is generally first placed into a "learn" mode, then an installer must "toggle" the door sensor, either by opening or closing a door to which the door sensor is mounted, causing the door sensor to transmit a signal to the security panel. An indication may be displayed on the security panel indicating successful inclusion of the door sensor, at which time the installer must place the security panel into a normal mode of operation. This process must be repeated for each sensor, and the process is especially cumbersome when sensors are located long distances from the security panel.

Remote home management and control systems are also popular. These systems allow local or remote control of a variety of electronic devices in homes, such as lights, music, pool equipment, sprinkler systems, appliances, heating and cooling systems, etc. Typically, a wireless control module is needed to control any such electronic device, such as a light switch controller that plugs into household AC power, and provides power to a light or other electronic device in response to wireless control signals sent by a home automation and control hub or gateway, for example. Again, the control modules must be "included" into the home automation and control hub or gateway to identify the number and type of control modules used in the system, and this process is likewise complex and in general need of professional installation.

It would be desirable, therefore, to be able to set up home security and automation/control systems without having to use the traditional method of including sensors/modules into such systems.

SUMMARY

The embodiments described herein relate to a method and apparatus for setup of a wireless home monitoring and control system. In one embodiment, a method is described, comprising receiving, by a processor via a receiver coupled to the processor, a wireless signal from a wireless sensor or a wireless control module, determining, by the processor, that the wireless sensor or the wireless control module is within a predetermined distance from the base station, and when the processor determines that the wireless sensor or the wireless control module is within the predetermined distance, extracting, by the processor, an identification of the wireless sensor or the wireless control module from the wireless signal, and storing, by the processor, the identification in a memory coupled to the processor.

In another embodiment, a base station is described for providing home monitoring and control, comprising a receiver, a memory for storing processor-executable instructions, a processor coupled to the receiver and the memory for executing the processor-executable instructions that causes the base station to, receive, by the processor, a wireless signal from a wireless sensor or a wireless control module, determine, by the processor, that the wireless sensor or the wireless control module is within a predetermined distance from the base station, and when the processor determines that the wireless sensor or the wireless control module is within the predetermined distance, extract, by the processor, an identification of the wireless sensor or the wireless control module from the wireless signal, and store, by the processor, the identification in the memory coupled to the processor.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present application relates to a base station used in a home security, home monitoring, home automation or home control system. The base station is configured to automatically accept new sensors or control modules when such new sensors or control modules are placed in proximity to the base station. As used herein, the term "base station" comprises a device located in a home that communicates wirelessly with one or more sensors or control modules dispersed throughout a home, comprising a device such as a security control module or panel, a hub or gateway coupled to the Internet, a dedicated home automation and control panel, and the like. The terms "home security", "home automation", "home monitoring", "home control", and "energy management and control" are each generally referred to herein as "home monitoring and control". The term "wireless sensor" is used to refer to any device capable of sensing a physical condition and transmitting a signal wirelessly, (for example, via RF, ultra-sound, infra-red techniques), such as a security door or window sensor, a motion sensor, a garage door tilt sensor, a glass break sensor, a thermometer (i.e., as used in a thermostat), a pressure sensor, a still or video camera, a siren listening device (for detecting when a fire alarm or carbon monoxide detector is sounding), a light sensor, and the like. The term "wireless control module" is used to refer to a device that is capable of receiving wireless signals from the base station and controlling an electronic device based on the wireless signals. Examples of such a wireless control module is a Z-Wave lamp control module, a Zigbee light bulb, a sprinkler system control module (for controlling a home sprinkler system), or a pool control module (for controlling pumps and heaters of a pool). In some cases, a device may qualify as both a wireless sensor and a wireless control module, for example, a wireless thermostat.

Figure 1:
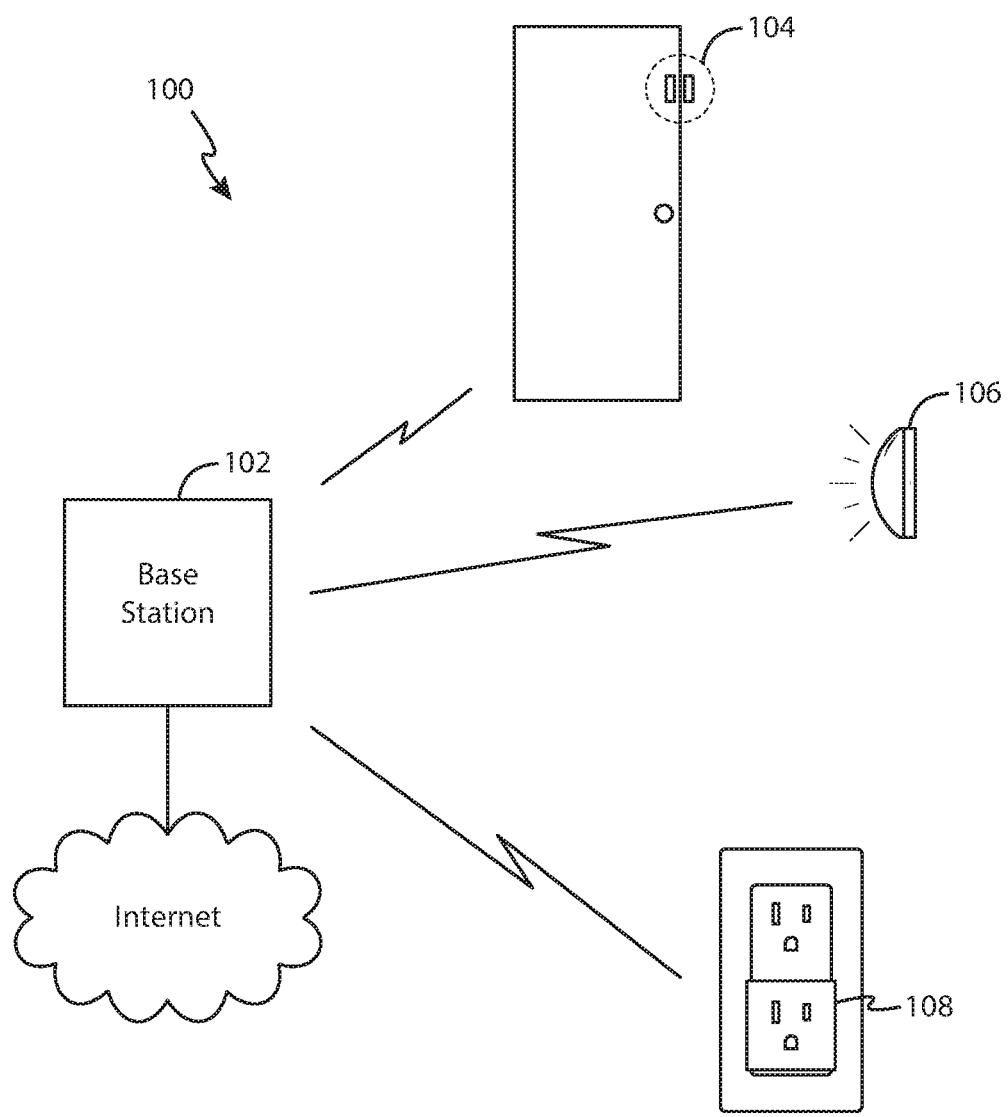
FIG. 1 is an illustration of one embodiment of a home monitoring and control system in accordance with the teachings herein.

FIG. 1 is an illustration of one embodiment of a home monitoring and control system 100, comprising a base station 102, wireless door sensor 104, a wireless motion sensor 106, and a wireless control module 108. Although FIG. 1 illustrates only a single door sensor 104, a single wireless motion sensor 106, and a single control module 108, in most cases a number of such wireless sensors and control modules are used in a typical home setting.

Upon installation of system 100, or upon adding new sensors or control modules, each of the sensors and control modules generally must be "learned" or "included" into base station 102, so that base station 102 can monitor or control the sensors and control modules, respectively. Sensors and control modules may be automatically included into base station 102 by merely placing such devices within a predetermined distance of base station 102.

In one embodiment, base station 102 may comprise an internal or external magnet for causing a reed switch to change state when a sensor containing such a reed switch is brought in proximity to the magnet. Reed switches are found in a vast majority of door and window security sensors in the market today. They may also be found in other devices, such as motion detectors, where a motion detector may comprise an internal reed switch for operating such motion sensors in conjunction with a door or window opening. Depending on the magnet strength, the distance required in order to cause such a reed switch to change state is approximately 0-3 inches. When a reed switch changes state, a sensor containing the reed switch typically transmits a wireless signal comprising an identification of the sensor, such as a sensor serial number and/or a sensor type (i.e., door sensor, window sensor, motion sensor, tilt sensor, smoke detector, carbon monoxide detector, etc.). In normal operation, the wireless signal serves as an indication to base station 102 that a door or window has been opened, movement in an area has occurred, a garage door has been opened, smoke or fire has been detected, carbon monoxide has been detected, etc. However, when a sensor is brought in close proximity to base station 102, the proximity alerts base station 102 that the sensor is new to system 100, and that base station 102 should add the sensor to its list of sensors active in system 100.

In other embodiments, no magnet is used to accepts new sensors or control modules. In this embodiment, a sensor or control module is activated by a user after it has been placed within a predetermined distance from base station 102. For example, a motion sensor could be brought within 3 feet of base station 102, and a user could wave his or her hand in front of the motion sensor, causing the motion sensor to transmit a wireless signal, similar to the embodiment described above. Base station 102 receives the wireless signal from the motion sensor, determines that the motion sensor is within the predetermined distance from base station 102, and then adds the motion sensor as a valid sensor in system 100.

Other devices may comprise a button or switch that causes these devices to transmit the wireless signal. In this case, a user can cause such a device to transmit the wireless signal by first placing the device within a predetermined range of base station 102, then pressing the button or switch that causes the device to transmit the wireless signal. As before, base station 102 receives the wireless signal, determines that the device is within the predetermined distance from base station 102, and then adds the device as a valid device in system 100.

In response to a successful inclusion, base station 102 may query a user to enter certain details concerning the just-added device, such as a device name, device type, a location where the device will be located, etc.

Figure 2:
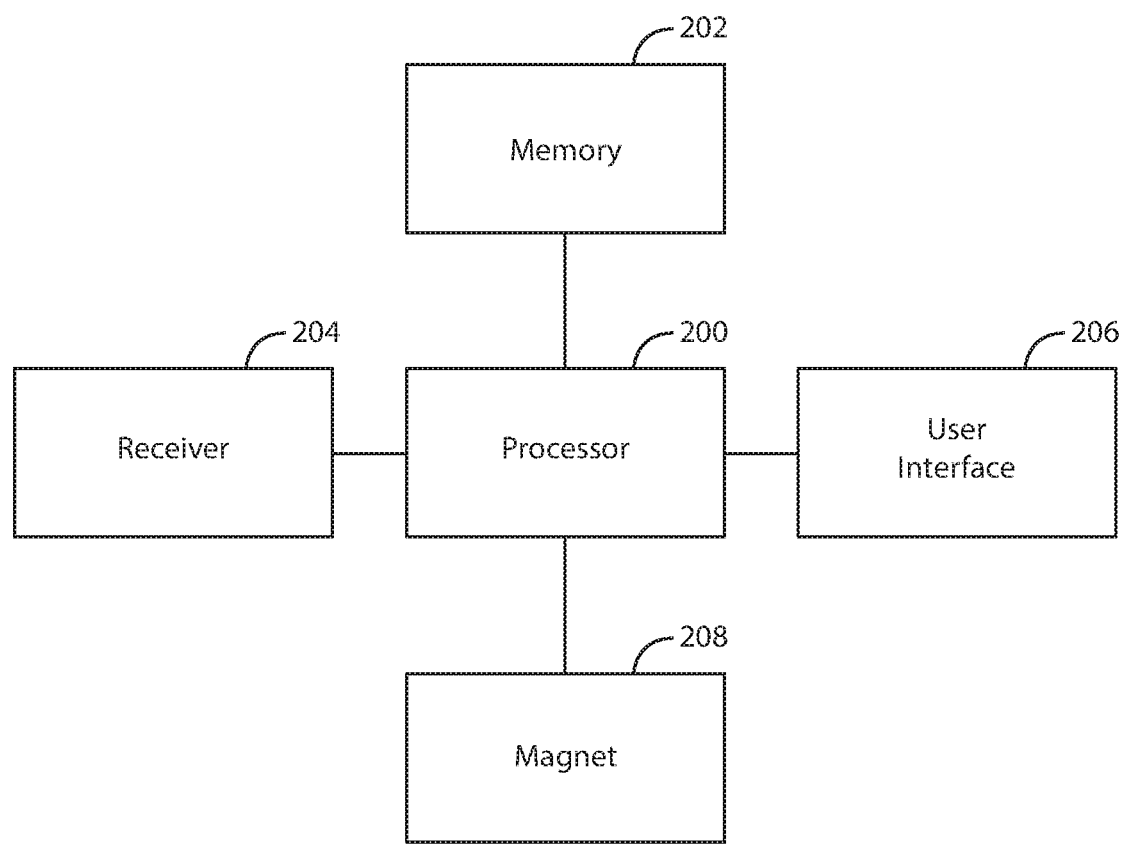
FIG. 2 is a functional block diagram of one embodiment of a base station as shown in FIG. 1.

FIG. 2 is a functional block diagram of one embodiment of base station 102, illustrating processor 200, memory 202, receiver 204, user interface 206 and optional magnet 208. It should be understood that the functional blocks shown in FIG. 2 may be connected to one another in a variety of ways, and that not all functional blocks necessary for operation of base station 102 are shown (such as a power supply), for purposes of clarity.

Processor 200 is configured to provide general operation of base station 102 by executing processor-executable instructions stored in memory 202, for example, executable code. Processor 200 typically comprises one or more general purpose microprocessors, microcomputers, and/or microcontrollers, selected based on such factors such as price, computing power, and size.

Memory 202 is coupled to processor 200 and comprises one or more information storage devices, such as RAM, ROM, flash memory, or virtually any other type of electronic, optical, or mechanical memory device. Memory 202 is used to store the processor-executable instructions for operation of base station 102, as well as any information used by processor 200 during operation of base station 102, such as identification information of any sensor or control modules that have been included in system 100, and status information as reported by the sensors.

Receiver 204 is coupled to processor 200 and comprises circuitry necessary to receive wireless signals from the sensors and the control modules. Such circuitry is well known in the art and may comprise BlueTooth, Wi-Fi, RF, optical, or ultrasonic circuitry, among others. Alternatively, or in addition, receiver 204 comprises well-known circuitry to provide signals to sensors and control modules via wiring, such as telephone wiring, twisted pair, two-conductor pair, CAT wiring, AC powerline wires, or other type of wiring.

User interface 206 is coupled to processor 302 and allows interaction between a user of system 100 and bases station 102. User interface 206 may comprise one or more pushbuttons, touchscreen devices, biometric readers, switches, sensors, keypads, and/or microphones that generate electronic signals for use by processor 200 upon initiation by a user. User interface 206 may additionally comprise one or more seven-segment displays, liquid crystal displays (LCDs), light emitting diode displays (LEDDs), light emitting diodes (LEDs), light arrays, or any other type of visual display. Further, the electronic display could alternatively or in addition comprise audio circuitry, such as an amplifier and a speaker, for audible presentation of information to a user.

In one embodiment, base station 102 additionally comprises magnet 208. Magnet 208 is typically mounted inside a housing of base station, emitting a relatively strong magnetic field, such as 20 Gauss, enough to change the state of a typical door/window reed switch when such a sensor is brought in close proximity to the magnet, such as 3 inches. A measure of the magnetic field strength required to operate a reed switch is generally expressed in ampere turns. The relationship between magnet strength (measured in gauss or Tesla) and reed switch sensitivity (measured in ampere-turns) to the corresponding activation distance depends on the magnet size, shape, and material, as well as the size and modification (if any) of the reed switch. Magnets are manufactured to feature-specific gauss strength. Magnet shape and size dictates how strong the magnetic field is at a specific distance from the magnet. In many motion and/or proximity sensor applications, it is known how much gauss is available to activate the switch. In general, there may exist a linear relationship between Gauss and Ampere Turn such that, in one embodiment, 0.1 milli-Tesla (mT) is equivalent to 1 Gauss, which is equivalent to 1 ampere turn.

Figure 3A:
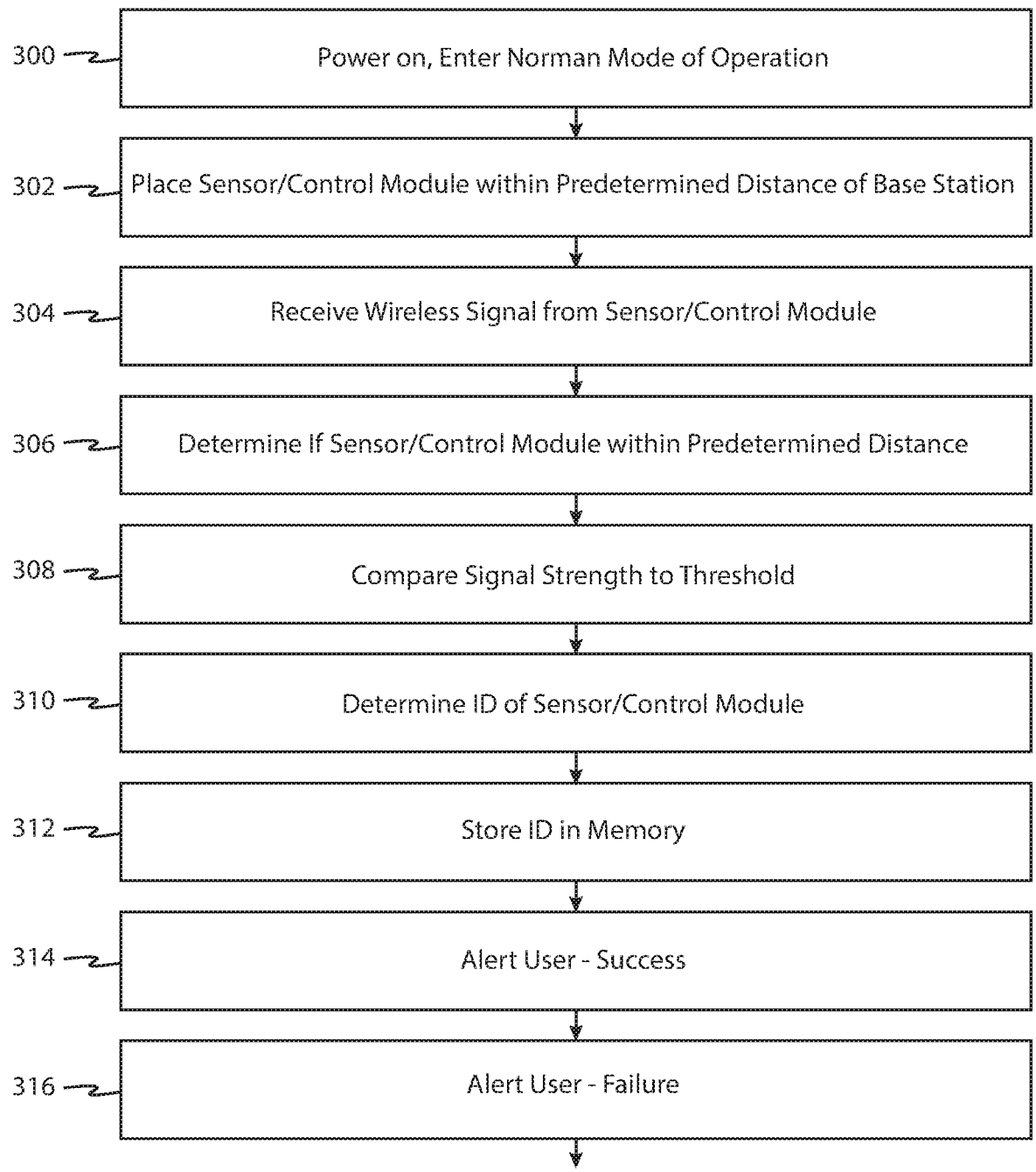
FIGS. 3A and 3B are a flow diagram illustrating one embodiment of a method for setup of a wireless home monitoring and control system.
Figure 3B:
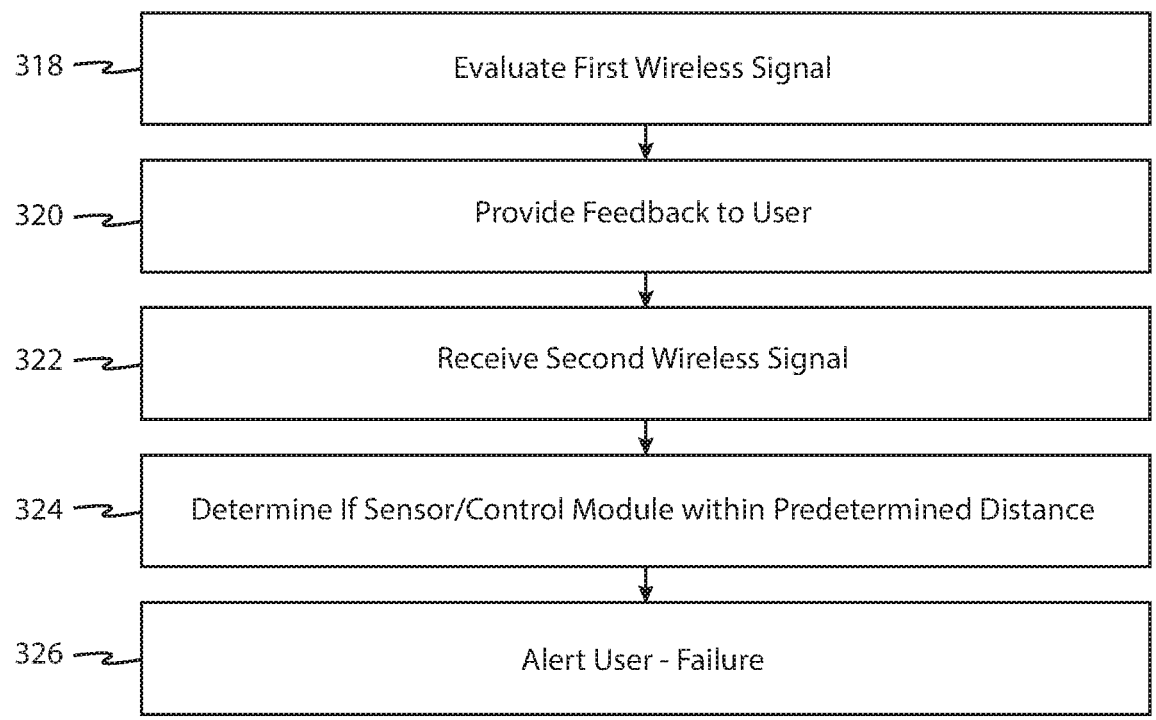

FIG. 3 is a flow diagram illustrating one embodiment of a method for setup of a wireless home monitoring and control system. It should be understood that in some embodiments, not all of the steps shown in FIG. 3 are performed. It should also be understood that the order in which the steps are carried out may be different in other embodiments.

At block 300, base station 102 is powered on and enters a "normal" mode of operation, i.e., monitors any sensors that have been previously included in system 100, as well as monitoring for any commands received from users to control one or more control modules that have previously included in system 100.

At block 302, a user wishing to enter a new sensor or control module into system 100 places the sensor or control module within a predetermined distance from base station 102 and, in particular, in one embodiment, to magnet 208 located inside base station 102. In one embodiment, base station 102 may comprise a housing having an area designated for a sensor to be placed. In the case of a sensor comprising a reed switch, the predetermined distance is a distance is a distance with will cause the reed switch to change state, as a result of encountering a magnetic field generated by magnet 208. Typically, this distance is between 0 and 3 inches from magnet 208.

When a sensor or control module does not comprise a reed switch, the predetermined distance is a distance that enables processor 200 to determine the sensor or control module is very close to base station 102, for example by processor 200 determining a signal strength of a wireless signal transmitted by the sensor or control module, as explained below. In this embodiment, the predetermined distance is from 0 to 5 feet from base station 102, for example.

At block 304, in the example of a sensor or control module comprising a reed switch, after the user places the sensor or control module within the predetermined distance from base station 102, receiver 204 receives a wireless signal transmitted by the sensor or control module in response to the reed switch changing state. In the example of a sensor or control module that does not contain a reed switch, receiver 204 receives the wireless signal after the user presses a button or switch on the sensor or control module, or otherwise causes the sensor or control module to transmit the wireless signal.

At block 306, the wireless signal is received by processor 200, where processor 200 determines whether the sensor or control module is within the predetermined distance. In one embodiment, receiver 204 determines a signal strength of the wireless signal, and the signal strength is provided to processor 200. In one embodiment, the signal strength is determined using the well-known received strength signal indicator, or RSSI, technique. In another embodiment, a similar technique known as received channel power indicator (RCPI) is used. Both techniques assign a range of numerical values to the received signal strength, for example, from 0 to 100. Different receiver manufacturers may use different RSSI numerical scales—one manufacturer may use a scale of 0 to 100, while another may use a scale of 0-60.

At block 308, processor 200 compares the signal strength of the received wireless signal to a threshold stored in memory 202. The threshold is predetermined and stored in memory 202 during the manufacturing process. The threshold is selected to ensure that a sensor or control module is, in fact, very close to the base station, indicating that a new sensor or control module is being introduced into system 100. For example, on an RSSI scale between 0 and 100, where 100 indicates the strongest signal strength, the threshold could be set to 95. In another embodiment, the threshold could be set to a percentage of an expected RSSI range, for example, 90%.

At block 310, when the signal strength exceeds the threshold, processor 200 determines an identification of the sensor or control module, by evaluating the wireless signal for a serial number or other identification sequence, and/or sensor type contained in the wireless signal.

At block 312, processor 200 stores the identification information (i.e., serial number) in memory 202, where it is used to determine whether subsequently-received signals are from sensors and control modules that have been included in system 100.

At block 314, processor 200 may cause user interface 206 to alert the user when the sensor or control module has been successfully introduced into system 100. Such an indication may comprise flashing an LED a predetermined number of times, one or more audible chirps, etc.

At block 316, if the signal strength does not exceed the threshold, processor 200 may cause user interface 206 to alert the user that the introduction has failed, by visual or audible means different from the indication provided to a user when the sensor or control module has been successfully introduced.

At block 318, in one embodiment, more than one wireless signal is transmitted by a sensor or control module during the introduction process. This embodiment may be used to better ensure that the sensor or control module is actually located within the predetermined distance from base station 102 by requiring evaluation of two or more wireless signals from a sensor or control module before a sensor or control module is included in system 100. In this embodiment, an initial wireless signal is generated and processed as described above.

At block 320, processor 200 provides feedback to the user after processor 200 has compared the signal strength in the initial wireless signal in the form of an indication, via user interface 206, that processor 200 has completed its comparison of the signal strength of the initial wireless signal to the threshold. The indication may indicate whether the comparison was successful, not successful or simply an indication that the comparison has been completed.

At block 322, as a result of receiving the indication in block 320, the user causes the sensor or control module to transmit a second wireless signal by pressing a button or switch on the sensor or control module, or otherwise causing the sensor or control module to transmit the second wireless signal while within the predetermined distance from base station 102. The second wireless signal is evaluated similar to the first wireless signal, to determine whether the signal strength of the second signal exceeds the threshold.

At block 324, processor 200 makes a determination of whether the sensor or control module is within the predetermined distance, in one embodiment, by averaging the number of times the wireless signal exceeds the threshold. In another embodiment, processor 200 causes user interface 206 to provide an indication to the user when the signal strength of x consecutive wireless signals exceeds the threshold, where x is 2, 3 or more. In addition, identification information from one or more of the wireless signals is stored in memory, indicating successful introduction of the sensor or control module into system 100.

At block 326, if processor 200 determines that the wireless signal did not exceed the threshold, or otherwise determines that the sensor or control module is not within the predetermined distance from bases station 102 based on multiple evaluations of multiple wireless signals, processor 200 ignores the sensor or control module, and does not store the identification information in memory 202, if the identification information was determined prior to the determination of whether the sensor or control module is within the predetermined distance. An indication may be presented to the user by processor 200 via user interface 206, indicating this failure.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method performed in association with a base station for setup of a wireless home monitoring and control system, comprising:
   using a magnet field emitted by a magnet of the base station to activate a wireless sensor or a wireless control module by changing a state of a reed switch of the wireless sensor or the wireless control module;
   receiving via a receiver of the base station from the activated wireless sensor or the wireless control module a wireless signal, the wireless signal having an identification data; and
   when the base station determines that the wireless signal was emitted from the wireless sensor or the wireless control module: extracting by the base station the identification from the wireless signal and storing by the base station the identification in a memory coupled to the base station.

2. The method of claim 1, wherein determining that the wireless signal was emitted from the wireless sensor or the wireless control module comprises determining by the base station that a signal strength of the wireless signal exceeds a predetermined threshold.

3. The method of claim 1, wherein determining that the wireless signal was emitted from the wireless sensor or the wireless control module is performed while the base station is in a normal mode of operation.

4. The method of claim 1, wherein, when the base station determines that the wireless signal was emitted from the wireless sensor or the wireless control module, the method further comprises causing a user interface coupled to the base station to alert a user that the wireless sensor or the wireless control module has been accepted by the base station.

5. The method of claim 1, wherein, when the base station determines that the wireless signal was emitted from the wireless sensor or the wireless control module, the method further comprises causing a user interface coupled to the base station to query a user as to a location where the wireless sensor or the wireless control module is to be installed; receiving by the base station input from the user via the user interface relating to the location; and storing by the base station the location in association with the identification in the memory.

6. The method of claim 1, wherein, when the base station determines that the wireless signal was emitted from the wireless sensor or the wireless control module, the method further comprises causing a user interface coupled to the base station to query a user as to a type of wireless sensor or wireless control module; receiving by the base station input from the user via the user interface relating to the type of wireless sensor or wireless control module; and storing by the base station the type in association with the identification in the memory.

7. The method of claim 1, further comprising using the identification extracted from the wireless signal to register the wireless sensor or wireless control module within the wireless home monitoring and control system.

\* \* \* \* \*